United States Patent
Hill

(10) Patent No.: US 7,150,012 B2
(45) Date of Patent: Dec. 12, 2006

(54) METHOD AND APPARATUS FOR ACCELERATING PROGRAM EXECUTION IN PLATFORM-INDEPENDENT VIRTUAL MACHINES

(75) Inventor: Tapio Hill, Helsinki (FI)

(73) Assignee: Nokia Corporation, Espoo (FI)

(*) Notice: Subject to any disclaimer, the term of this patent is extended or adjusted under 35 U.S.C. 154(b) by 624 days.

(21) Appl. No.: 10/270,829

(22) Filed: Oct. 15, 2002

(65) Prior Publication Data

US 2004/0073904 A1    Apr. 15, 2004

(51) Int. Cl.
G06F 9/45 (2006.01)
G06F 9/455 (2006.01)
G06F 9/46 (2006.01)

(52) U.S. Cl. ............... 717/158; 717/151; 718/1; 719/310

(58) Field of Classification Search ............ 718/1–108; 717/139–158; 719/310
See application file for complete search history.

(56) References Cited

U.S. PATENT DOCUMENTS

| | | | | |
|---|---|---|---|---|
| 5,905,895 A | * | 5/1999 | Halter | 717/139 |
| 6,170,083 B1 | * | 1/2001 | Adl-Tabatabai | 717/158 |
| 6,760,907 B1 | * | 7/2004 | Shaylor | 717/158 |
| 6,934,940 B1 | * | 8/2005 | Bates et al. | 717/152 |
| 2002/0104076 A1 | * | 8/2002 | Shaylor | 717/148 |
| 2003/0101208 A1 | * | 5/2003 | Chauvel et al. | 709/1 |
| 2003/0225917 A1 | * | 12/2003 | Partamian et al. | 709/310 |
| 2004/0015917 A1 | * | 1/2004 | Click et al. | 717/150 |

OTHER PUBLICATIONS

Voss et al., "High-Level Adaptive Program Optimization With Adapt", ACM, 2001, pp. 93-102.*
Suganuma et al., "A Dynamic Optimization Framework for a JAVA Just-In-Time Compiler", ACM, 2001, pp. 180-194.*
Armstrong, "Hotspot: A New Breed of Virtual Machine", JAVAWORLD.COM, 1998, pp. 1-11.*

* cited by examiner

Primary Examiner—Meng-Al T. An
Assistant Examiner—Jennifer N. To
(74) Attorney, Agent, or Firm—Hollingsworth & Funk, LLC

(57) ABSTRACT

A method and apparatus for accelerating program execution in platform-independent systems by eliminating repeated hot spot recognition in virtual machines. Optimization information for programs operable on a target device is stored. It is determined whether stored optimization information exists for a current program available on the target device, and if so, the optimization information associated with the current program is retrieved. The retrieved optimization information is used to identify program code segments earlier identified for optimization processing. Portions of the current program not identified for optimization processing are interpreted via an interpreter, and at substantially the same time, the program code segments identified for optimization processing to native code of the target device are compiled. Using the stored optimization information eliminates the need to analyze the program for program hot spots each time the program is loaded.

35 Claims, 7 Drawing Sheets

METHOD AND APPARATUS FOR ACCELERATING PROGRAM EXECUTION IN PLATFORM-INDEPENDENT VIRTUAL MACHINES

FIELD OF THE INVENTION

This invention relates in general to virtual machine processing, and more particularly to a method and apparatus for accelerating program execution in platform-independent systems by eliminating repeated hot spot recognition in virtual machines.

BACKGROUND OF THE INVENTION

Computing systems and other devices utilizing processing devices operate based on machine code that is specific to the particular hardware platform of the computing system or processor. "Native code" is a term generally referring to the code that runs on a specific hardware platform after it is compiled. With Java or other similar environments, the execution of the code via a virtual machine running on top of the hardware platform is generally slower than native code execution. This is generally due to the relatively slow nature of virtual machine interpretation, which refers to the instruction-by-instruction translation of the machine language (e.g., Java bytecodes) of the virtual machine. Interpretation methodologies are generally slow, as many native instructions may be necessary to simulate only one virtual machine instruction.

To address this issue in the context of virtual machines, a number of virtual machine implementation variants have been devised, such as Just-In-Time (JIT) compilers, Dynamic Adaptive Compilation (DAC), and variations of Ahead-Of-Time (AOT) compilation. These methods generally include some aspect of compilation of the machine language of the virtual machine, which allows native code to be executed versus the instruction-by-instruction interpretation that may each result in multiple native instructions. Certain portions of the program executed by the virtual machine may therefore be identified for compiling, while other portions are interpreted.

However, existing virtual machine implementations expend a significant amount of time determining which portions of the program are to be compiled versus interpreted. To exacerbate the problem, these programs may be executed again and again, resulting in repeated determinations of the which program segments should be interpreted, and which should be compiled. This analysis is time consuming, and adversely affects the overall execution speed of the program.

Accordingly, there is a need for an expedited virtual machine, and a method for expediting virtual machine execution where program hot spots are earmarked for compilation in an implementation employing both interpretation and compilation techniques. The present invention fulfills these and other needs, and offers other advantages over the prior art approaches.

SUMMARY OF THE INVENTION

To overcome limitations in the prior art described above, and to overcome other limitations that will become apparent upon reading and understanding the present specification, the present invention discloses a method and apparatus for accelerating program execution in platform-independent systems by eliminating repeated hot spot recognition in virtual machines.

In accordance with one embodiment of the invention, a method is provided for increasing execution speed of platform-independent programs on a target device. The method includes storing optimization information for programs operable on the target device. It is determined whether stored optimization information exists for a current program available on the target device, and if so, the optimization information associated with the current program is retrieved. The retrieved optimization information is used to identify program code segments that were earlier identified for optimization processing. Portions of the current program that are not identified for optimization processing are interpreted via an interpreter, and at substantially the same time, the program code segments identified for optimization processing to native code of the target device are compiled. Using the stored optimization information in this manner eliminates the need to repeatedly analyze the program for frequently used or otherwise processing-intensive program code segments or "hot spots" each time the program is loaded.

In accordance with more particular embodiments of such a method, storing the optimization information includes storing a program identifier that uniquely identifies a program code segment, and storing data identifying a quantity of code associated with the program code segment. For example, the quantity of code may be determined by the start address and the size of the program code segment, by the start and end addresses of the program code segment, etc. In another particular embodiment, determining whether stored optimization information exists for a current program involves comparing a first identifier, such as a program identifier associated with the current program, to corresponding identifiers associated with the stored optimization information. In other particular embodiments of such a method, the interpretation and compilation is realized using a Java™ Virtual Machine (JVM). Various embodiments of the JVM include implementation as a Dynamic Adaptive Compiler (DAC), and implementation as a Just-In-Time (JIT) compiler.

In accordance with another embodiment of the invention, a method is provided for increasing execution speed of platform-independent program code on a target device. Program code segments meriting optimization processing are identified. The program code is first interpreted in connection with a first program code execution. Optimization information relating to each of the program code segments identified for optimization processing is stored. Upon a subsequent program code execution, the optimization information for the program code is retrieved. Using this optimization information, the program code segments subject to optimization processing are identified. The identified program code segments are compiled to native code of the target device in parallel with the interpreting of program code that is not subject to optimization processing.

In accordance with another embodiment of the invention, a virtual machine is provided for processing platform-independent programs on a host device, where the virtual machine executes on top of a resident hardware platform which executes native code. The virtual machine includes a compare module to compare stored optimization information with at least one of the programs on the host device to determine whether one or more program segments are available for optimization processing. An interpretation module is provided for interpreting one or more first program segments that are determined by the compare module to be unavailable for optimization processing. A compiler module is provided for compiling to native code one or more second program segments that are determined by the compare module to be available for optimization processing.

In more particular embodiments of such a virtual machine, an optimization recognition module is provided to analyze the program in connection with a first execution of the program, and to store the optimization information for use in subsequent executions of the program, wherein the optimization information identifies at least the second program segments that are available for optimization processing. In another other particular embodiment, the virtual machine is implemented as a Java Virtual Machine (JVM) configured to execute Java bytecode. In more particular embodiments the JVM is implemented as a Dynamic Adaptive Compiler (DAC), or a Just-In-Time (JIT) compiler. In accordance with various embodiments of the invention, the host device includes devices such as a computing system coupled to receive bytecode via a wired connection, or a wireless device such as a mobile phone, personal digital assistance, wireless computer, etc. coupled to receive bytecode via a wireless connection.

In accordance with another embodiment of the invention, a computer-readable medium having instructions stored thereon which are executable by a computing system for increasing execution speed of platform-independent programs on a target device is provided. The instructions perform steps including storing optimization information for one or more programs operable on the target device, determining whether stored optimization information exists for a current program, retrieving the optimization information for the current program if the optimization information exists for the current program, using the retrieved optimization information to identify program code segments of the program identified for optimization processing, interpreting portions of the current program that are not identified for optimization processing, and concurrently compiling the program code segments identified for optimization processing to native code of the target device.

In accordance with another embodiment of the invention, a computer data signal embodied in a carrier wave by a computing system and encoding a computer program for increasing execution speed of platform-independent programs on a target device is provided. The computer program includes instructions for performing various steps, including storing optimization information for one or more programs operable on the target device, determining whether stored optimization information exists for a current program, retrieving the optimization information for the current program if the optimization information exists for the current program, using the retrieved optimization information to identify program code segments of the program identified for optimization processing, interpreting portions of the current program that are not identified for optimization processing, and concurrently compiling the program code segments identified for optimization processing to native code of the target device.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION OF THE INVENTION

Figure 1:
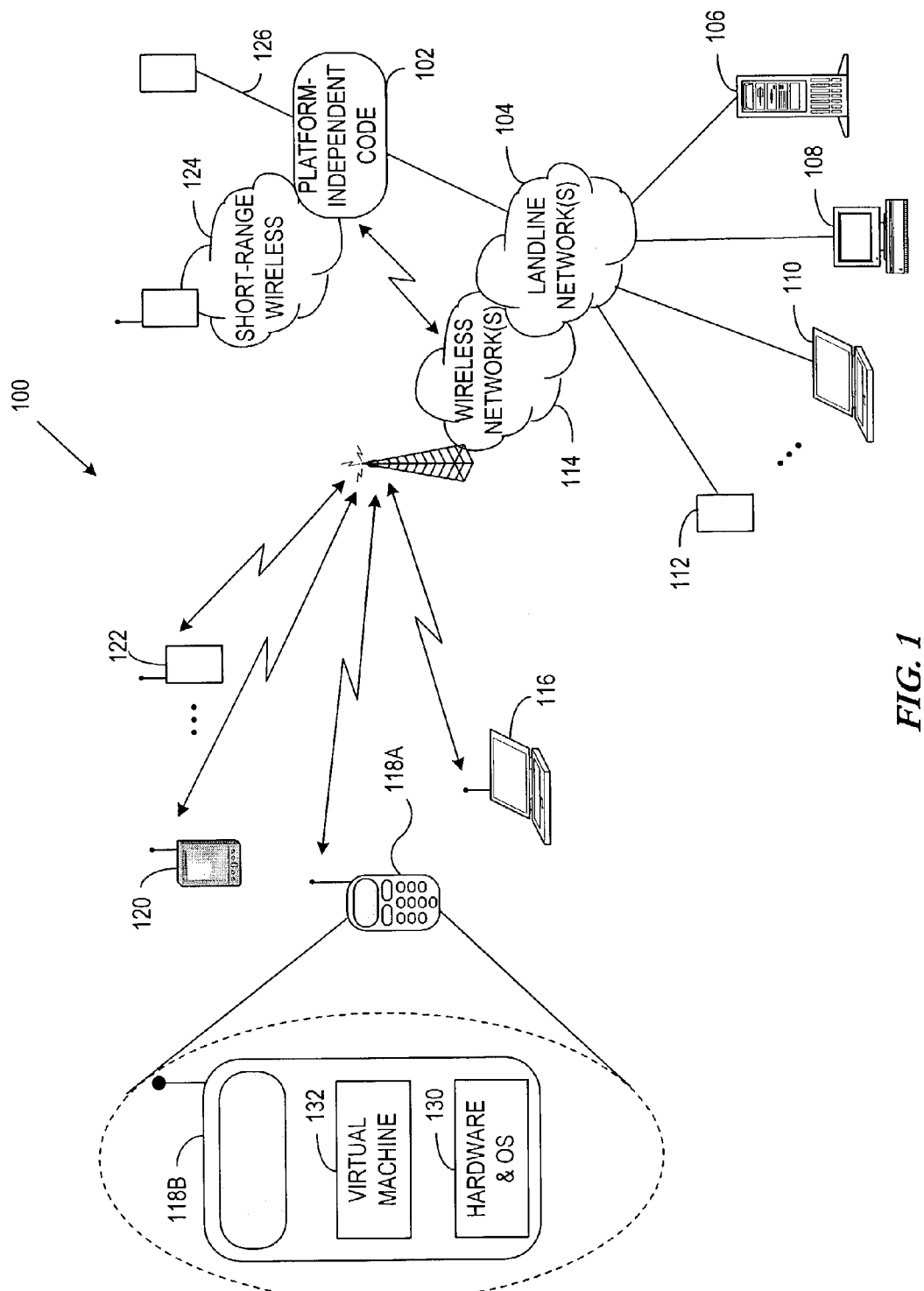
FIG. 1 illustrates a representative system environment in which the principles of the present invention may be employed.

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides a method and apparatus for accelerating program execution in platform-independent systems. Computing and other electronic devices having a native platform, such as the hardware and operating system of the devices, may also be equipped with an actual or virtual machine running on top of the native platform to provide program translation services. As the name implies, a "virtual machine" generally has little or no hardware directly associated therewith, and is generally implemented in software. Such a virtual machine, however, may be partially implemented (or in the case of an actual machine, totally implemented) in hardware and/or a combination of hardware, firmware, and/or software. As used herein, a virtual machine is a platform-independent machine operable on program code and implemented using at least an interpreter and compiler. While the interpreter and compiler perform similar services in that they both ultimately translate the incoming program code to a native machine language comprehensible by the native operating system (OS) and hardware, they do so in different ways. The present invention provides a manner of accelerating operations associated with these program code translations, which ultimately speeds the end-to-end execution time of the program code.

In order to facilitate an understanding of the present invention, various embodiments are described below in connection with currently-known virtual machines that are implemented in software. A particularly popular virtual machine, the Java™ Virtual Machine (JVM), is used as a representative example of an architecture-neutral and portable language platform in which the principles of the present invention may be applied. However, it will be readily apparent to those skilled in the art from the description provided herein that the present invention is equally applicable to analogous programming and virtual machine technologies, whether existing currently or in the future. Therefore, references to Java™, Java byte codes, JVMs, etc. are provided for purposes of illustration, and not of limitation.

With Java or analogous programming platforms, a program is both compiled and interpreted, which differs from other conventional programming techniques. When programming in Java, a compiler is first used to translate a program into an intermediate language referred to as Java bytecode (JBC). Bytecode, as used herein, refers to the platform-independent code processed by the virtual machine at execution time, where the standard virtual machine processing involves an interpreter parsing and running each bytecode instruction on the executing device. Therefore, while compilation may occur just once in the development environment, interpretation may occur each time the program is executed. The bytecode thus serves as the machine code instructions for the JVM, and the interpreter is in essence an implementation of the JVM.

More particularly, bytecode interpretation involves dynamically interpreting each bytecode into platform-specific machine instructions in an interpreter loop. However, this methodology is slow, as many native instructions may be necessary to simulate only one virtual machine instruction. The execution speed issue has spawned a number of different methods of implementing a JVM, often used in collaboratively with the JVM interpreter. These different methods include Just-In-Time (JIT) compilation, Dynamic Adaptive Compilation (DAC), and variations of Ahead-Of-Time (AOT) compilation. JIT compilation attempts to address the speed deficiency of bytecode interpretation by compiling blocks of bytecode into native code as the blocks are invoked, rather than dynamically interpreting each bytecode. A JIT compiler translates a number of bytecodes into native code the first time the JIT compiler is presented with the bytecodes, and then executes the machine instructions instead of interpreting the bytecodes. Native code runs faster in the native host environment by eliminating the repeated compiling that takes place with interpretation.

Another method of implementing a JVM includes dynamic adaptive compilation. A Dynamic Adaptive Compiler (DAC) is similar to a JIT compiler, as it translates bytecode into machine code on the fly. However, a DAC generally includes additional intelligence. Bytecodes are first subjected to interpretation, and the runtimes for each method are recorded. Methods that tend to execute slowly are compiled and optimized by way of the DAC. Subsequent calls to such optimized methods thereafter use the native code that was generated by the compiler. There is a lead time during which the bytecode is interpreted, after which time the DAC can determine what should be compiled to native code.

Using a DAC (or other analogous optimizing virtual machine), the first run in the target system proceeds normally after an application has been installed on the target system. The DAC recognizes the program "hot spots," which refers to one or more sequences of a program that are executed more than once (and generally executed frequently), such as loop structures. However, such methods therefore engage in hot spot recognition which consumes time, and is performed every time the application is launched. The present invention eliminates the need of the DAC to each time the application in the slower interpreted mode to collect the required behavioral information to be used as the basis for optimization through compiling certain relevant portions of the program/application. One aspect of the present invention that facilitates the elimination of this repeated hot spot recognition and thereby increases execution speed involves marking the hot spots for subsequent optimization procedures. More particularly, the behavior history and/or compilation information can be stored, and on subsequent program executions they can be read from where they were first stored during the first (or at least a previous) execution of that application.

Thus, in accordance with the present invention, a virtual machine implementation, such as a DAC, is configured to store optimization information from the first/previous execution of the bytecode or other program. Where the DAC (or JIT compiler, etc.) generally starts running an application in interpreted mode, which is slow, a DAC (or JIT compiler, etc.) configured in accordance with the present invention can immediately start compiling the relevant portions of the application according to optimization information stored from a previous run. This speeds the execution of a "known" application, such as a permanently installed application, an APPlet that is or will be executed multiple times, etc.

FIG. 1 illustrates a representative system environment 100 in which the principles of the present invention may be employed. The representative system environment 100 illustrates that the platform-independent code 102, such as Java™ bytecodes, may be provided to target devices in any number of known manners. These manners include via a landline network(s) 104, which may include a Global Area Network (GAN) such as the Internet, one or more Wide Area Networks (WAN), Local Area Networks (LAN), and the like. Any computing device or other electronic device that supports platform-independent code 102 may be the target system that utilizes the present invention, such as servers 106, desktop computers 108 or workstations, laptop or other portable computers 110, or any other similar computing device capable of communicating via the network 104, as represented by generic device 112.

The code may be provided via one or more wireless networks 114, such as Global System for Mobile Communications (GSM), Universal Mobile Telecommunications System (UMTS), Personal Communications Service (PCS), Time Division Multiple Access (TDMA), Code Division Multiple Access (CDMA), or other mobile network transmission technology. Again, any computing device or other electronic device that supports platform-independent code 102 may be the target system that utilizes the present invention, such as laptop or other portable computers 116, mobile phones 118A and other mobile communicators, Personal Digital Assistants (PDA) 120, or any other similar computing device capable of communicating via the wireless network 114, as represented by generic device 122.

The code 102 may be provided to devices using short-range wireless technologies 124, such as Bluetooth, Wireless Local Area Network (WLAN), infrared (IR), etc. The code 102 can also be distributed using direct wired connections, such as depicted by connection path 126. The present invention is applicable regardless of the manner in which code 102 is provided or distributed to the target devices.

A example of a target device that supports platform-independent code 102 is illustrated as the mobile phone 118B. The device 118B includes, for example, hardware and an operating system (OS) 130, and also includes a virtual machine 132 for processing the platform-independent code 102. The present invention may be implemented as part of the virtual machine 132, and in the case of Java bytecode, the virtual machine 132 represents a Java Virtual Machine (JVM).

Figure 2:
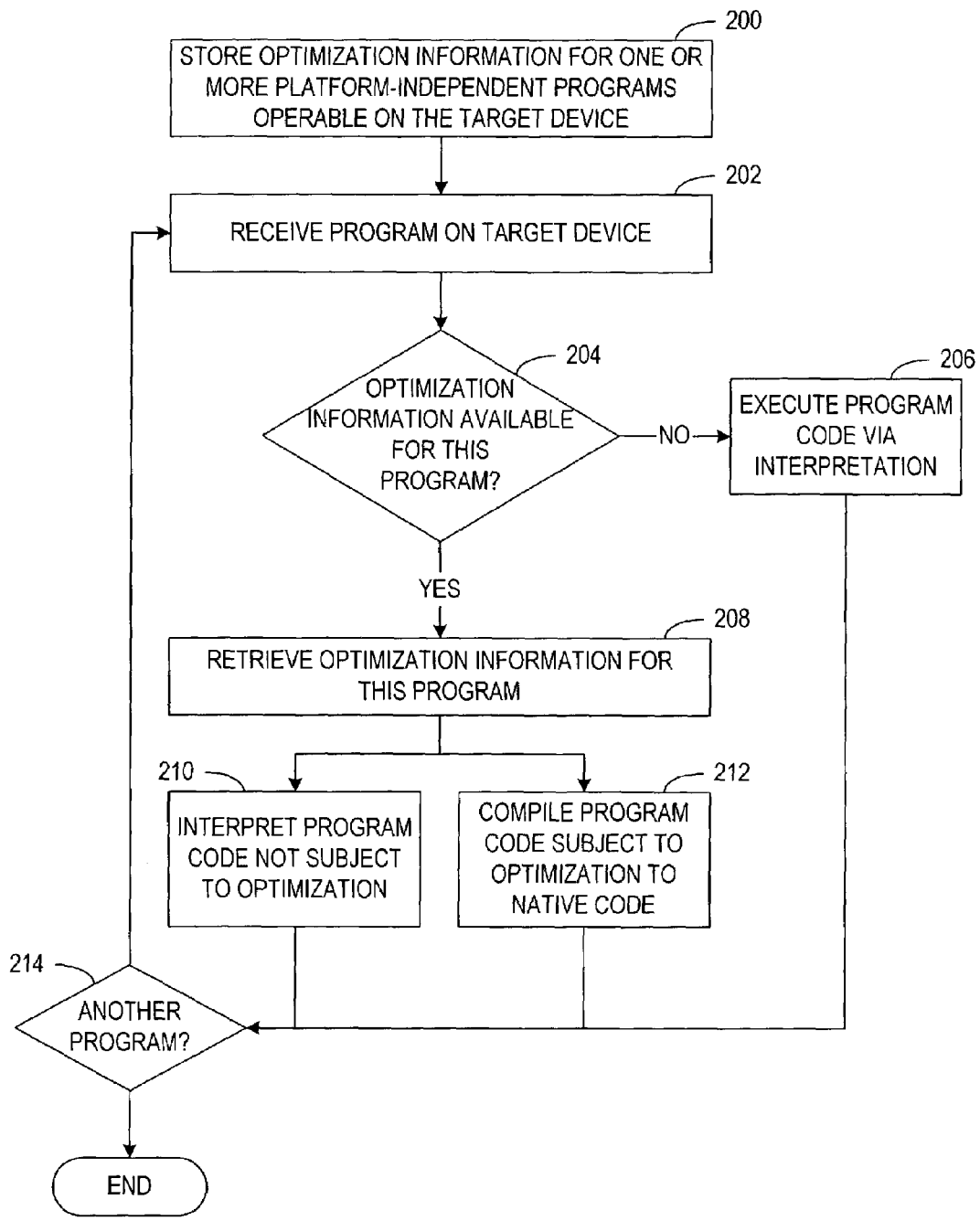
FIG. 2 is a flow diagram illustrating a representative method for increasing execution speed of platform-independent program code on a target device in accordance with the present invention.

FIG. 2 is a flow diagram illustrating a representative method for increasing execution speed of platform-independent program code on a target device in accordance with the present invention. This diagram is directed to an embodiment where any number of programs may be received at the target device. It is noted that the terms "application," "program," "program code," and other analogous terminology may be used interchangeably herein, and are used to broadly refer to any application or other program that can be received for execution on the target device. Optimization information is stored 200 for one or more platform-independent applications that are operable on the target device. This optimization information may be stored for a particular application in a number of different ways, including storing the information in a separate file common to all applications in a system, in separate application-specific files, in cache, in the Java ARchive (JAR), in the Java Archive Descriptor (JAD) file, in the application itself, in a removable memory, etc. These variations, as well as various embodiments in which the optimization information to be recognized prior to storage, are described more fully below.

The target device receives 202 a particular application, and it is determined 204 whether optimization information is available for this application; e.g., whether optimization information has previously been stored for this particular application. If not, the program is executed via interpretation techniques. For example, where no optimization information is available for the particular application, an interpreter associated with the virtual machine will interpret each of the instructions associated with the program "on the fly." If additional programs are to be executed as determined at decision block 214, the target device receives 202 the next program.

If it is determined 204 that optimization information is available for the particular program, the optimization information is retrieved 208 for this program. Portions of the program that are not subject to optimization, as determined from the optimization information, are executed by way of interpretation as shown at block 210. Portions of the program that are subject to optimization, again determined from the optimization information, are compiled to native code. By using the stored optimization information, compilation 212 can be performed concurrently with interpretation 210 of the remaining portion of the program, which reduces the overall time required to execute the program. It should be noted that by compiling and interpreting concurrently, this does not imply that the interpretation and compilation procedures must begin and/or end at precisely the same time. While in some embodiments this may be the case, in other embodiments these processes simply run in parallel. If additional programs are to be executed as determined at decision block 214, the target device receives 202 the next program.

Figure 3:
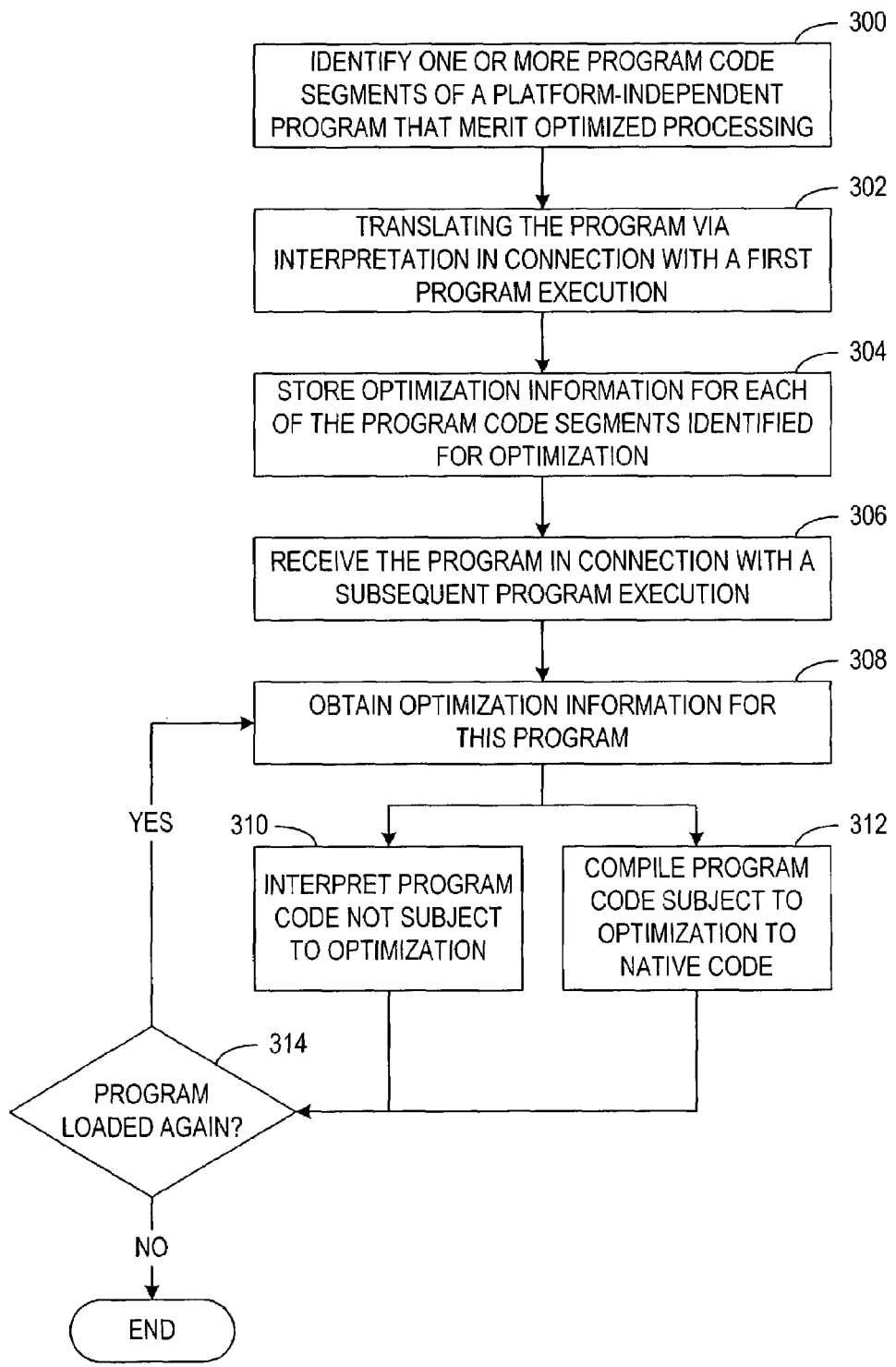
FIGS. 3 and 4 illustrate additional flow diagrams of representative methods for increasing execution speed of platform-independent program code on a target device in accordance with the present invention.

FIG. 3 is another flow diagram illustrating a representative method for increasing execution speed of platform-independent program code on a target device in accordance with the present invention. This diagram is directed to an embodiment where a program may be executed multiple times, and where optimization information is stored in connection with execution of the program at a first time for use in execution of the program at a subsequent time. One or more program code segments associated with a program and meriting optimized processing are identified 300. For example, program "hot spots," including but not limited to certain loop structures, program segments that may be executed frequently, program segments that may require an undesirable time to execute via interpretation, etc. The particular parameters used to identify the program hot spots may vary. In one embodiment, the number of times the program segment(s) is executed during execution of the program is used to identify the program segment(s) as a hot spot. In another embodiment, identification of the program segments as hot spots involves determining a predetermined number of the program segments that are executed the most relative to one another. For example, the three program segments that are associated with the highest use counts may be identified as hot spots.

The program is translated 302 in connection with a first execution of that program by way of an interpreter or other on-the-fly translation technology that translates the code as it is being executed. A "first" execution of the program as used in this example refers to any execution prior to a subsequent program execution that utilizes the stored optimization information. While this may refer to the actual "first" execution of that program on the target device, it may also refer to any execution preceding a subsequent program execution where the optimization information is utilized. Further, in one embodiment of the invention, identification 300 of the program code segments that merit optimized processing is performed in connection with the first program execution, although this need not be the case. For example, in one embodiment of the invention, the identification 300 of the program segments that merit optimized processing is determined as the program is translated 302, such as during the first time that program is executed on the target device.

Optimization information for each program code segment identified for optimization is stored 304. In one embodiment, storing of the optimization information for those code segments warranting optimization may be performed as the program is translated 302. The optimization information may include, for example, an identification of the program (program ID), a start address of each of the one or more hot spots identified for optimization, and the size of the hot spot code segment. Other information may also be provided, such as a use count indicating the number of times a particular hot spot is executed.

The program is then subsequently received at the target device in connection with a subsequent execution of that program, as depicted at block 306. The optimization information previously stored for the program is obtained 308, and used to determine which portions of the program are to be interpreted and which are to be compiled. By storing the optimization information previously and retrieving this information upon a subsequent execution of the program, the program's hot spots do not need to be re-identified. Thus, the time required to interrogate the program for hot spots need not be expended in executions of that program after the initial hot spot interrogation. This saves considerable time when the program is re-executed.

Thus, the optimization information is used to identify the program code that is interpreted 310, which includes the program code that is not subject to optimization as governed by the optimization information. At the same time, the program code that is subject to optimization is compiled 312 to native code. Because the stored optimization information was readily available, compilation 312 of those program segments that were marked for compilation can begin immediately, rather than waiting for recognition of the hot spots. If the program is again loaded as determined at decision block 314, the optimization information can again be obtained 308, and this accelerated process can continue.

Figure 4:
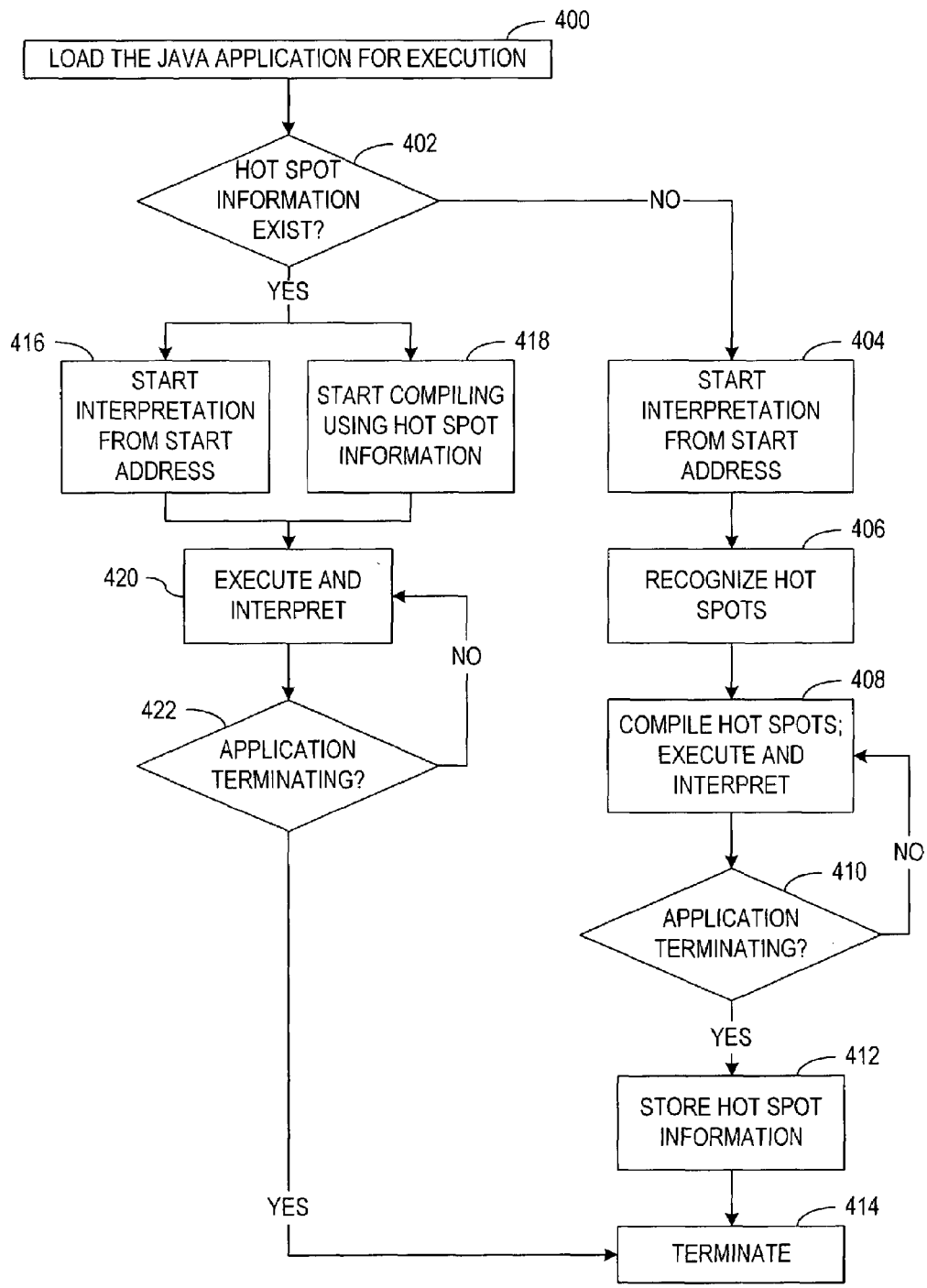

FIG. 4 is another flow diagram illustrating a representative method for increasing execution speed of platform-independent program code on a target device in accordance with the present invention. The illustrated embodiment is described where the target device implements a Java™ platform, such as a Java Virtual Machine (JVM) and a Dynamic Adaptive Compiler (DAC). The illustrated embodiment is also applicable to other program platforms, and to other implementations of virtual machines such as a Just-In-Time (JIT) compiler.

Java bytecode is loaded 400 to the target device for execution. The Java bytecode can be provided to the target device in any number of ways, such as the representative manners described in connection with FIG. 1. It is determined whether hot spot information exists, as depicted at decision block 402. Hot spot information (i.e., optimization information), may exist where the application was previously executed on the target device. In another embodiment, the hot spot information may be provided together with the bytecode, in which case the program (i.e., bytecode) may not have required previous execution on the given target device. Further, in other embodiments, the hot spot information can be provided separately to the target device, such as embedded in firmware, provided via removable memory or storage, or otherwise downloaded to the target device.

If no hot spot information exists, interpretation of the bytecode starts from the start address, as shown at block 404. In the illustrated embodiment, hot spots are recognized 406 by interrogating the bytecode to determine which program segments, if any, should be compiled rather than interpreted on the fly. The hot spots are compiled, and the compiled code is executed and the non-compiled code is interpreted as shown at block 408. Until the application terminates as determined at decision block 410, this compilation and interpretation continues to fully process the bytecode. When the application is terminating, hot spot information is stored 412, and the application terminates 414. As can be seen by this example, the first execution of this bytecode requires that the hot spots be recognized, and the compiled. In accordance with the present invention, subsequent execution of that bytecode will not require such hot spot recognition, and compilation is not subject to this recognition delay, as is now described.

Assuming that the application/bytecode is again loaded 400 to the target device, it is again determined 402 whether hot spot information exists. Because this application was previously executed, and hot spot information was stored 412, hot spot information will exist for this particular loaded application. In such case, interpretation of the bytecode starts from the start address as shown at block 416, and at substantially the same time, compiling of hot spots starts with the assistance of the previously stored hot spot information. The compiled code is executed and the non-compiled code is interpreted as shown at block 420. Until the application terminates as determined at decision block 422, this compilation and interpretation continues to fully process the bytecode. As can be seen from this example, interpretation may begin from the start address immediately, without being subjected to hot spot recognition delays. Further, the compilation of the marked hot spots will start at substantially the same time, as scheduled by the process manager of the virtual machine. Thus, for previously executed bytecode, permanently installed applications, or bytecode associated with hot spot information obtained via other means, interpretation and compilation can be initiated faster than the case where hot spot recognition is required upon each execution of that particular application/program.

There may be multiple hot spots marked for any given application. If there are several marked hot spots, the compilation may be ordered according to any one or more predetermined parameters, including appearance, usage count, and size. In some cases, particularly with devices with small memories, this would allow for a certain hot spot to remain in the memory even while the execution moves temporarily to other portions of the application. Also, this would allow for the use of predetermined hot spots, e.g., manually selected optimization of embedded Java applications.

Figure 5:
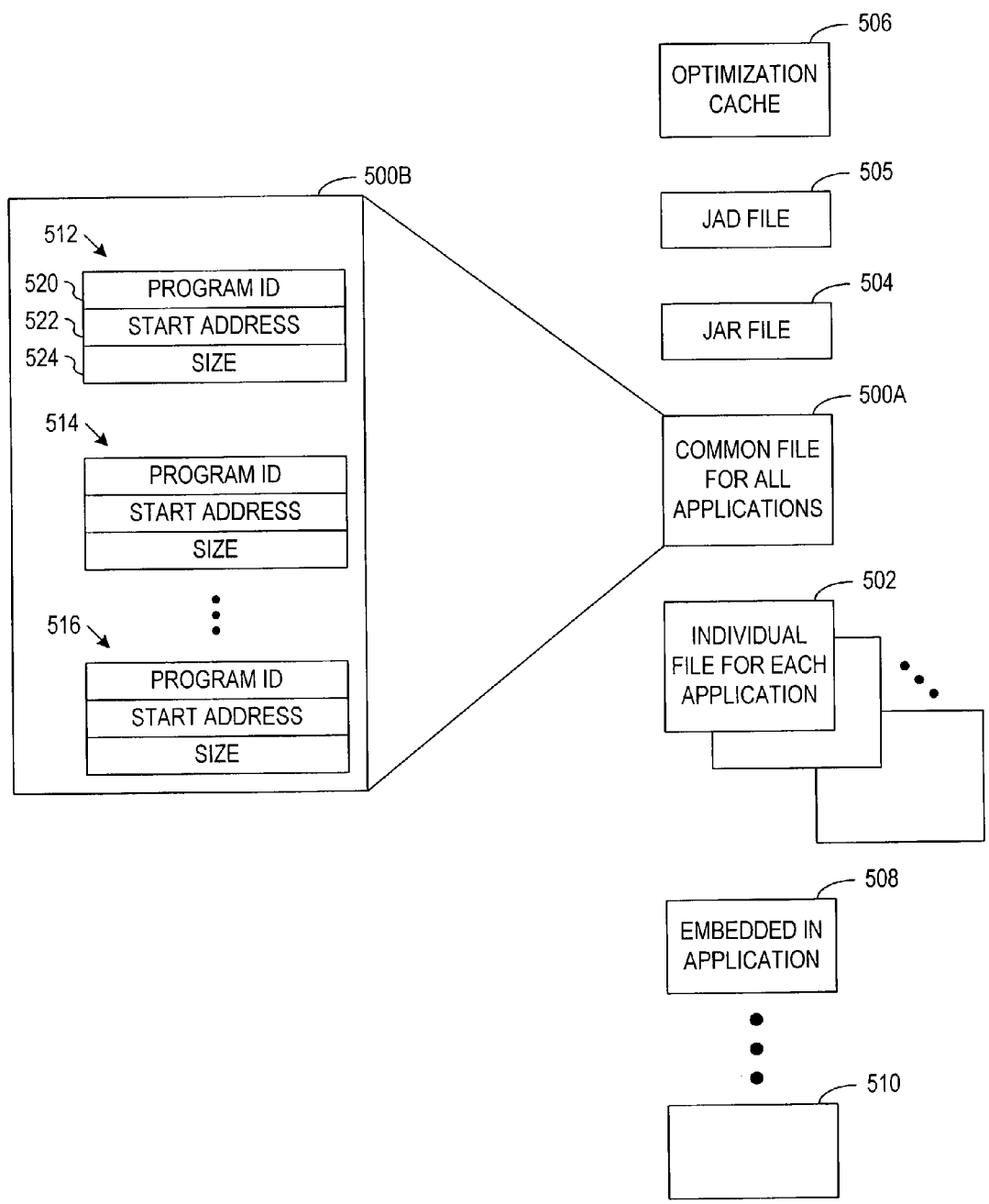
FIG. 5 illustrates various representative manners in which the hot spot information can be stored or otherwise provided to the target device.

As indicated above, the optimization information or hot spot information may be stored for a particular application in a number of different ways. FIG. 5 illustrates various representative manners in which the hot spot information can be stored or otherwise provided to the target device. For example, the hot spot information may be recorded into a separate file 500A common for all applications in a system, into separate application specific files 502, into a Java ARchive (JAR) file 504 for aggregating multiple files (or analogous file depending on the platform(s) supported by the target device), or into a Java Archive Descriptor (JAD) file 505. The hot spot information may also be stored in an optimization cache 506, which may be a preferred manner of storing hot spot information in the case of transitory applications such as Applets, Servlets, etc. The hot spot information may also be provided by embedding the information in the application itself, as depicted by block 508. Other manners of storing the hot spot information may also be used, as represented by generic recording block 510.

The stored information relating to marked hot spots can include a variety of information items. The common file 500A is expanded upon as file 500B, which illustrates the contents of one particular embodiment of such a file. In the illustrated embodiment, the file 500B includes a plurality of marked hot spots 512, 514, 516. Each of the marked hot spots includes, for example, a program identifier 520 that identifies the particular program or application to which the marked hot spot belongs. This identifier can be used to determine whether a particular application has a stored hot spot associated therewith. For example, when an application having a program identifier is downloaded to a device or called up locally, the program identifier can be compared to the stored program identifier 520 to determine whether hot spot information has been stored for that application. A start address 522 of the hot spot is provided to indicate where in the application the compilation should begin. Also provided is the size 524 of the hot spot segment, which provides an indication of the amount of program code to be compiled. Other information can be provided in addition or in lieu of some of the information described above. For example, an end address could be used rather than a hot spot size to indicate the extent of program code to be compiled for that hot spot. Furthermore, information such as a usage count, i.e., the number of executions of that hot spot, may also be provided.

Figure 6:
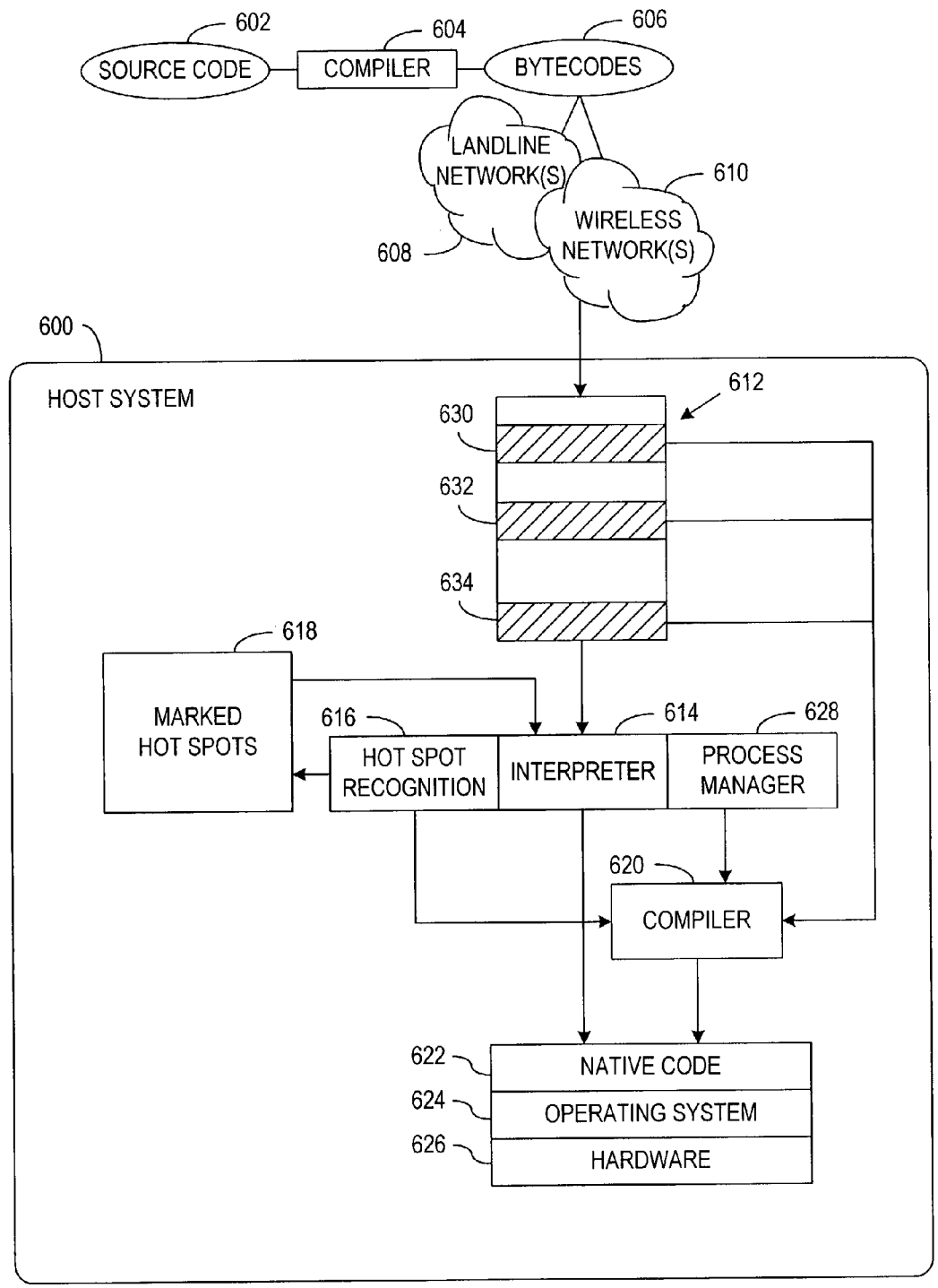
FIG. 6 is a block diagram illustrating an exemplary embodiment of a representative host system utilizing the principles of the present invention.

FIG. 6 is a block diagram illustrating an exemplary embodiment of a representative host system 600 utilizing the principles of the present invention. The target or host system 600 represents any device that supports the particular platform-independent program code utilized. In this embodiment, it will be assumed that the host system 600 represents a Java-enabled device, such as, for example, a Java-enabled mobile phone. This example also assumes that the Java program to be executed on the host system 600 is a downloadable program, such as an Applet. Source code 602 for the program is compiled via the compiler 604 into bytecodes 606, which in turn may be communicated via any one or more landline networks 608 and/or wireless networks 610. The host system 600 receives the bytecodes in, for example, the method area 612 where the bytecodes reside in a typical JVM.

In a first execution of the program, the interpreter 614, which may be implemented as part of a DAC, starts interpretation at the start address. Hot spots are recognized via the hot spot recognition module 616, and are stored as marked hot spots in hot spot storage 618. Hot spot storage 618 generically represents any manner of recording hot spots, as was described in connection with FIG. 5. The interpreter 614 and compiler 620 then execute the program code and hot spots, by translating bytecode into native code 622 and executing that code via the operating system 624 and hardware 626 of the host system 600.

In a subsequent execution of the program, the hot spots have been stored at storage 618. In this case, the hot spot recognition module 616 is not needed, as marked hot spots in the hot spot storage 618 can be retrieved for immediate processing. The interpreter 614, process manager 628, or other software or hardware module associated with the virtual machine can perform the comparison of the current program to the program identifiers stored in the hot spot storage 618. Using the stored hot spot information, the program can immediately initiate interpretation of the program code in the method area 612, and the compiler 620 can also immediately initiate compilation of hot spots 630, 632, 634. In this manner, interpretation and compilation can be quickly initiated, without any hot spot recognition delay.

Figure 7:
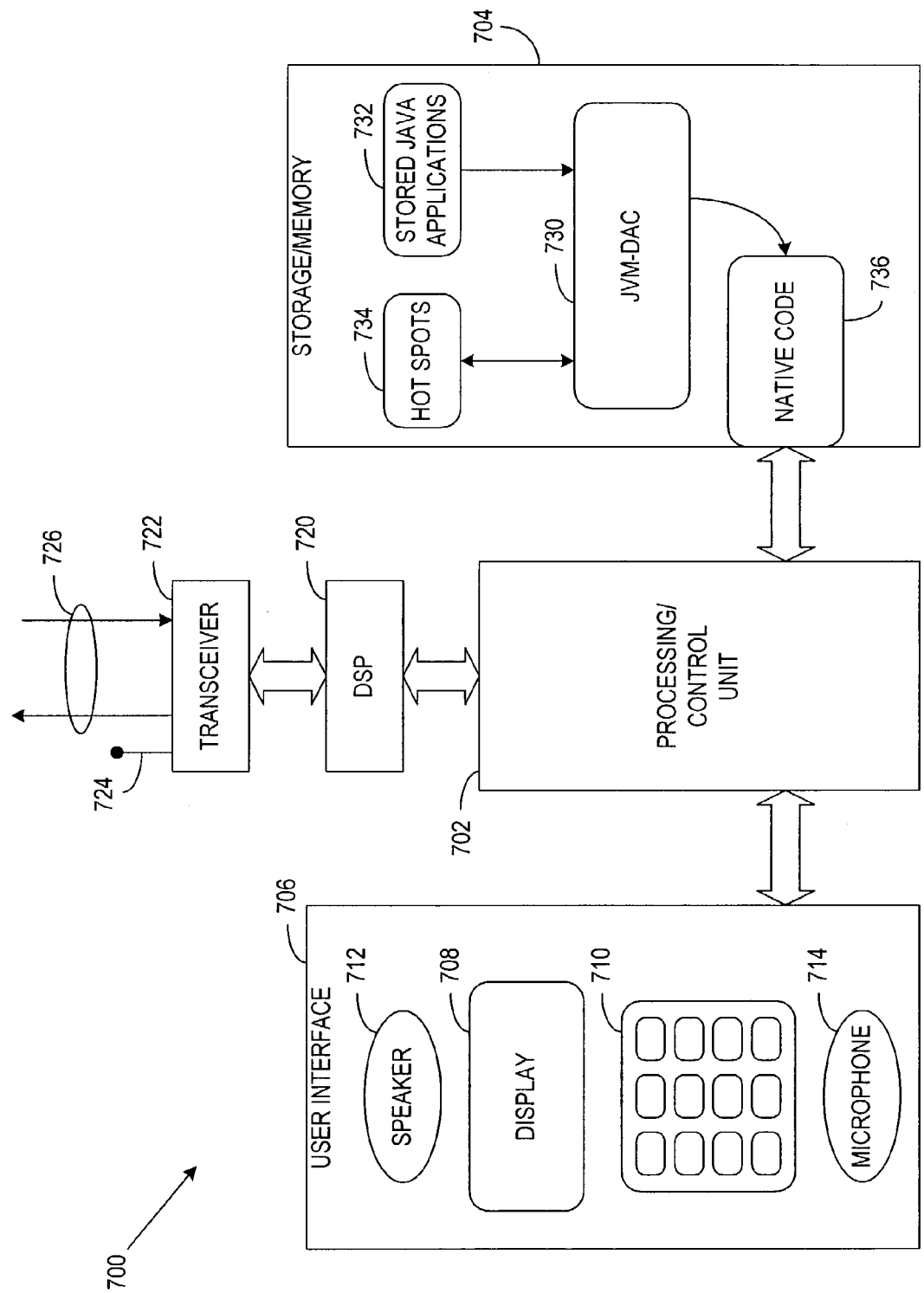
FIG. 7 illustrates an example of a host/target device in which the principles of the present invention are applicable.

As previously indicated, the present invention may be used with any number of different devices configured for executing platform-independent code. Desktop and portable computers, servers, and wireless handsets represent a few of the well-known types of host systems that are enabled for this type of program execution. FIG. 7 illustrates one example of a host/target device in which the principles of the present invention are applicable, and is provided for purposes of illustration and not of limitation. FIG. 7 is also described in terms of Java™, Java bytecode, and Java Virtual Machines. Those skilled in the art will recognize from the description provided herein that the present invention is equally applicable to other systems having program execution capabilities, and other programming technologies.

FIG. 7 illustrates a mobile computing arrangement 700 associated with a mobile device. The mobile computing arrangement 700 is representative of a processing environment associated with any number of Java-enabled wireless devices, such as wireless/cellular telephones, personal digital assistants, or other wireless handsets, as well as portable computing devices capable of wireless communication. The mobile devices utilize computing systems to control and manage the conventional device activity as well as the functionality provided by the present invention. Hardware, firmware, software or a combination thereof may be used to perform the various functions, display presentations and operations described herein.

The exemplary mobile computing arrangement 700 suitable for performing the operations in accordance with the present invention includes a processing/control unit 702, such as a microprocessor, reduced instruction set computer (RISC), or other central processing module. The processing unit 702 need not be a single device, and may include one or more processors. For example, the processing unit may include a master processor and associated slave processors coupled to communicate with the master processor.

The processing unit 702 controls the basic functions of the mobile device as dictated by programs available in the program storage/memory. Thus, the processing unit 702 executes the underlying functions of the JVM. More particularly, the program storage/memory 704 may include an operating system (not shown) and program modules for carrying out functions and applications on the mobile device. For example, the program storage may include one or more of read-only memory (ROM), flash ROM, programmable and/or erasable ROM, random access memory (RAM), subscriber interface module (SIM), wireless interface module (WIM), smart card, other removable memory device, etc. Software modules may also be obtained from an external source, such as downloaded via data signals.

The processor 702 is also coupled to user-interface 706 elements associated with the mobile device. The user-interface 706 may include, for example, a display 708 such as a liquid crystal display, a keypad 710, speaker 712, and microphone 714. These and other user-interface components are coupled to the processor 702 as is known in the art. The keypad 710 includes alpha-numeric keys for performing a variety of functions, including dialing numbers and executing operations assigned to one or more keys. For example, in accordance with the present invention, various functions to initiate downloading and/or executing a Java program may be effected via the keypad 710. Alternatively, other user-interface mechanisms may be employed, such as voice commands, switches, touch pad/screen, graphical user interface using a pointing device, trackball, joystick, or any other user interface mechanism.

The mobile computing arrangement 700 may also include a digital signal processor (DSP) 720. The DSP 720 may perform a variety of functions, including analog-to-digital (A/D) conversion, digital-to-analog (D/A) conversion, speech coding/decoding, encryption/decryption, error detection and correction, bit stream translation, filtering, etc. The transceiver 722, generally coupled to an antenna 724, transmits and receives the radio signals 726 between the wireless device and the wireless network to which it communicates. For example, Java Applets may be wirelessly received via the transceiver 722 of a Java-enabled mobile device.

In connection with the present invention, the storage/memory 704 of the mobile computing arrangement 700 includes a JVM 730, which in the illustrated embodiment is implemented as a DAC. The storage/memory 704 may include stored Java (or other) applications 732. Java applications may also be downloaded via wireless or landline/wireless networks. The JVM-DAC 730 may also be initially downloaded via a network such as the Internet and intermediary wireless networks, or from another mobile device. In accordance with the invention, hot spots 734 are stored to ultimately increase overall execution speed by allowing interpretation and compilation by the JVM-DAC 730 to begin translating bytecodes to native code 736 more quickly. The native code, whether arising via interpretation or compilation, is then processed by the processing/control unit 702.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media such as resident memory devices, smart cards or other removable memory devices, or transmitting devices, thereby making a computer program product or article of manufacture according to the invention. As such, "computer readable mediums" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, the Internet, intranets, telephone/modem-based network communication, hardwired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for increasing execution speed of platform-independent programs on a target device, comprising:
   determining optimization information for one or more programs during a first execution of the one or more programs on the target device;
   storing the optimization information for the one or more programs in response to the first execution of the one or more programs;
   determining whether the stored optimization information exists for a current program;
   retrieving the optimization information for the current program if the optimization information exists for the current program;
   using the retrieved optimization information to identify one or more program code segments of the program identified for optimization processing; and
   interpreting portions of the current program that are not identified for optimization processing, and concurrently compiling the one or more program code segments identified for optimization processing to native code of the target device.

2. The method of claim 1, wherein storing optimization information comprises storing at least a program identifier unique to the program code segment, and storing data identifying a quantity of code associated with the program code segment.

3. The method of claim 2, wherein storing optimization information further comprises storing a use count indicating the number of times the program code segment identified for optimization processing is executed.

4. The method of claim 1, wherein storing optimization information comprises storing at least a program identifier, a program code segment start address, and a program code segment size.

5. The method of claim 1, wherein storing optimization information comprises storing at least a program identifier, a program code segment start address, and a program code segment end address.

6. The method of claim 1, wherein storing optimization information comprises embedding the optimization information in the program.

7. The method of claim 1, wherein storing optimization information comprises storing the optimization information in one or more files resident on the target device.

8. The method of claim 1, wherein storing optimization information comprises storing the optimization information in one or more of a memory, cache, or storage device resident on the target device.

9. The method of claim 1, wherein storing optimization information comprises storing the optimization information in a removable memory removably coupled to the target device.

10. The method of claim 1, wherein using the retrieved optimization information to identify program code segments comprises obtaining program start addresses of the one or more program code segments from which compiling can be initiated.

11. The method of claim 10, wherein compiling the one or more program code segments identified for optimization comprises compiling the one or more program code segments stored at the program start addresses.

12. The method of claim 1, wherein determining whether stored optimization information exists for a current program comprises comparing a first identifier associated with the current program to second identifiers associated with the stored optimization information.

13. The method of claim 1, wherein compiling the program code segments identified for optimization processing comprises initiating the compiling in response to identifying the program code segments of the program identified for optimization processing.

14. The method of claim 1, wherein interpreting and compiling comprises interpreting and compiling using a Java Virtual Machine.

15. The method of claim 14, wherein interpreting and compiling using a Java Virtual Machine comprises interpreting and compiling using a Dynamic Adaptive Compiler as an implementation of the Java Virtual Machine.

16. The method of claim 14, wherein interpreting and compiling using a Java Virtual Machine comprises interpreting and compiling using a Just-In-Time (JIT) compiler as an implementation of the Java Virtual Machine.

17. A method for increasing execution speed of platform-independent program code on a target device, comprising:
   interpreting the program code in connection with a first program code execution;
   identifying one or more program code segments of the program code meriting optimization processing during the first program code execution;
   storing optimization information relating to each of the program code segments identified for optimization processing in response to the first program code execution;
   retrieving the optimization information for the program code in connection with a subsequent program code execution;
   using the retrieved optimization information to identify the program code segments subject to optimization processing; and
   compiling the identified program code segments to native code of the target device in parallel with interpreting the program code that is not subject to optimization processing.

18. The method of claim 17, wherein:
   identifying one or more program code segments comprises identifying a plurality of program code segments meriting optimization processing; and
   compiling the identified program code segments comprises compiling the identified program code segments in an order based on one or more of the relative appearance, usage count, and size of the plurality of program code segments.

19. The method of claim 17, wherein identifying one or more program code segments meriting optimization processing comprises identifying the program code segments that are executed at least a predetermined number of times during execution of the program code.

20. The method of claim 17, wherein identifying one or more program code segments meriting optimization processing comprises identifying a predetermined number of the program code segments having the highest use counts relative to one another.

21. The method of claim 17, wherein compiling in parallel with interpreting comprises substantially concurrently initiating the compiling and the interpreting in response to the identification of the program code segments subject to optimization processing.

22. The method of claim 17, wherein storing optimization information relating to each of the program code segments comprises storing the optimization information during the interpreting of the program code associated with the first program code execution.

23. The method of claim 17, wherein the first program code execution corresponds to an original execution of the program code.

24. The method of claim 17, wherein the first program code execution corresponds to any execution of the program code prior to the subsequent program code execution.

25. A virtual machine for processing platform-independent programs on a host device, wherein the virtual machine executes on top of a resident hardware platform which executes native code, the virtual machine comprising:
  an optimization recognition module to analyze at least one of the programs on the host device in connection with a first execution of the program, and to store the optimization information for use in subsequent executions of the program, wherein the optimization information identifies segments of the program that are available for optimization processing;
  a compare module to compare the stored optimization information with the program on the host device to determine whether one or more of the program segments are available for optimization processing;
  an interpretation module for interpreting one or more first program segments that are determined by the compare module to be unavailable for optimization processing; and
  a compiler module for compiling to native code one or more second program segments that are determined by the compare module to be available for optimization processing, wherein the compiler module compiles the one or more second program segments in parallel with the interpretation module's interpreting of the one or more first program segments.

26. The virtual machine as in claim 25, wherein the stored optimization information is embedded in the program on the host device.

27. The virtual machine as in claim 25, further comprising a memory to store the optimization information for use by the compare module.

28. The virtual machine as in claim 25, wherein the virtual machine comprises a Java Virtual Machine (JVM) configured to execute Java bytecode.

29. The virtual machine as in claim 28, wherein the JVM comprises a Dynamic Adaptive Compiler (DAC).

30. The virtual machine as in claim 28, wherein the JVM comprises a JIT compiler.

31. The virtual machine as in claim 25, wherein the host device is a computing system coupled to receive bytecode via a wired connection at the host device.

32. The virtual machine as in claim 25, wherein the host device is a wireless device coupled to receive bytecode via a wireless connection at the host device.

33. The virtual machine as in claim 32, wherein the wireless device comprises any one of a mobile phone, personal digital assistant, and wireless computer.

34. The virtual machine as in claim 25, further comprising means for storing the optimization information.

35. A computer-readable data storage medium having instructions stored thereon which are executable by a computing system for increasing execution speed of platform-independent programs on a target device by performing steps comprising:
  determining optimization information for one or more programs during a first execution of the one or more programs on the target device;
  storing the optimization information for the one or more programs operable on the target device in response to the first execution of the one or more programs;
  determining whether stored optimization information exists for a current program;
  retrieving the optimization information for the current program if the optimization information exists for the current program;
  using the retrieved optimization information to identify program code segments of the program identified for optimization processing; and
  interpreting portions of the current program that are not identified for optimization processing, and concurrently compiling the program code segments identified for optimization processing to native code of the target device.

* * * * *